(12) United States Patent
Yusuf

(10) Patent No.: US 12,378,066 B2
(45) Date of Patent: Aug. 5, 2025

(54) EASYLID

(71) Applicant: Iram Yusuf, San Antonio, TX (US)

(72) Inventor: Iram Yusuf, San Antonio, TX (US)

( * ) Notice: Subject to any disclaimer, the term of this patent is extended or adjusted under 35 U.S.C. 154(b) by 31 days.

(21) Appl. No.: 17/548,566

(22) Filed: Dec. 12, 2021

(65) Prior Publication Data
US 2023/0182999 A1  Jun. 15, 2023

(51) Int. Cl.
*B65F 1/16* (2006.01)

(52) U.S. Cl.
CPC ..................... *B65F 1/16* (2013.01)

(58) Field of Classification Search
CPC ....... A47G 11/004; A61B 46/10; A61B 46/17; B65F 2001/1653
USPC .......................... 220/730, 731; 150/154–165
See application file for complete search history.

(56) References Cited

U.S. PATENT DOCUMENTS

| | | | | |
|---|---|---|---|---|
| 5,747,751 A | * | 5/1998 | Weckerle | A61B 46/10 600/528 |
| 7,063,114 B2 | * | 6/2006 | Sanchelli | A47L 1/16 37/285 |
| 2019/0308807 A1 | * | 10/2019 | Yusuf | B65F 1/1415 |
| 2021/0145193 A1 | * | 5/2021 | Presley | B60N 3/004 |

* cited by examiner

*Primary Examiner* — Mollie Impink

(57) ABSTRACT

The easy lid cover is a new invention created for the purpose of keeping the lids of household or commercial garbage bins free from food, trash, and other dirt. When secured to the lid of a garbage bin, the easy lid cover keeps the lids of garbage bins clean by providing a barrier to the top, bottom, and sides of the lid. The easy lid cover is secured to the lid with flaps positioned at a top edge of the easy lid cover; the flaps are secured around the back of the lid and fastened to a bottom of the easy lid cover. The flaps are spaced apart, providing room for the hinge of a lid if one is present. The easy lid cover can be easily removed and disposed from any sized and shaped garbage bin lid.

2 Claims, 6 Drawing Sheets

EASYLID

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

Garbage bin lids frequently become soiled or dirty from the trash within the bin. This product covers the lids of garbage bins so that they remain clean and are not soiled or made dirty from inside facing the garbage disposed of or outside facing away from the garbage. The cover is made to cover the whole lid from inside and outside, and a handle can be attached to the cover as well made of the same material.

BRIEF SUMMARY OF THE INVENTION

This is a utility and design product for any and every garbage bin lid which can be lifted or picked up or removed and replaced. This can be made to fit any lid of a foot operated garbage bin or one which has a lid that can be removed and replaced by hands or a garbage can with a simple lid that can be flipped open by hand and is attached to the garbage can from one end. This product covers the lids of garbage bins so that they remain clean and are not soiled or made dirty from inside facing the garbage disposed of or outside facing away from the garbage.

This product covers the lids of garbage bins so that they remain clean and are not soiled or made dirty from inside facing the garbage disposed of or outside facing away from the garbage. The cover is made to cover the whole lid from inside and outside, and a handle can be attached to the cover as well made of the same material.

The cover can be made to cover only the inside of the lid facing the garbage with an elastic rim or an adjustable one with a string to pull it to fit the size of the lid. This product can be made of any material which is usable in a domestic and/or commercial setting. Not limited to paper, plastic, fabric or any combination thereof. This product is available and can be made in different colors encompassing the entire color spectrum.

BRIEF DESCRIPTION OF THE SEVERAL VIEWS OF THE DRAWING(S)

DETAILED DESCRIPTION OF THE INVENTION

The FIGS. 1-6 show the different views of the garbage bin lid cover. A stands for the rectangular garbage bin lid cover. B stands for the circular garbage bin lid cover.

The garbage bin lid cover is a slide on cover with two plastic flaps with adhesive strips to keep the top and bottom sides attached to each other keeping the cover in its place.

Figure 1:
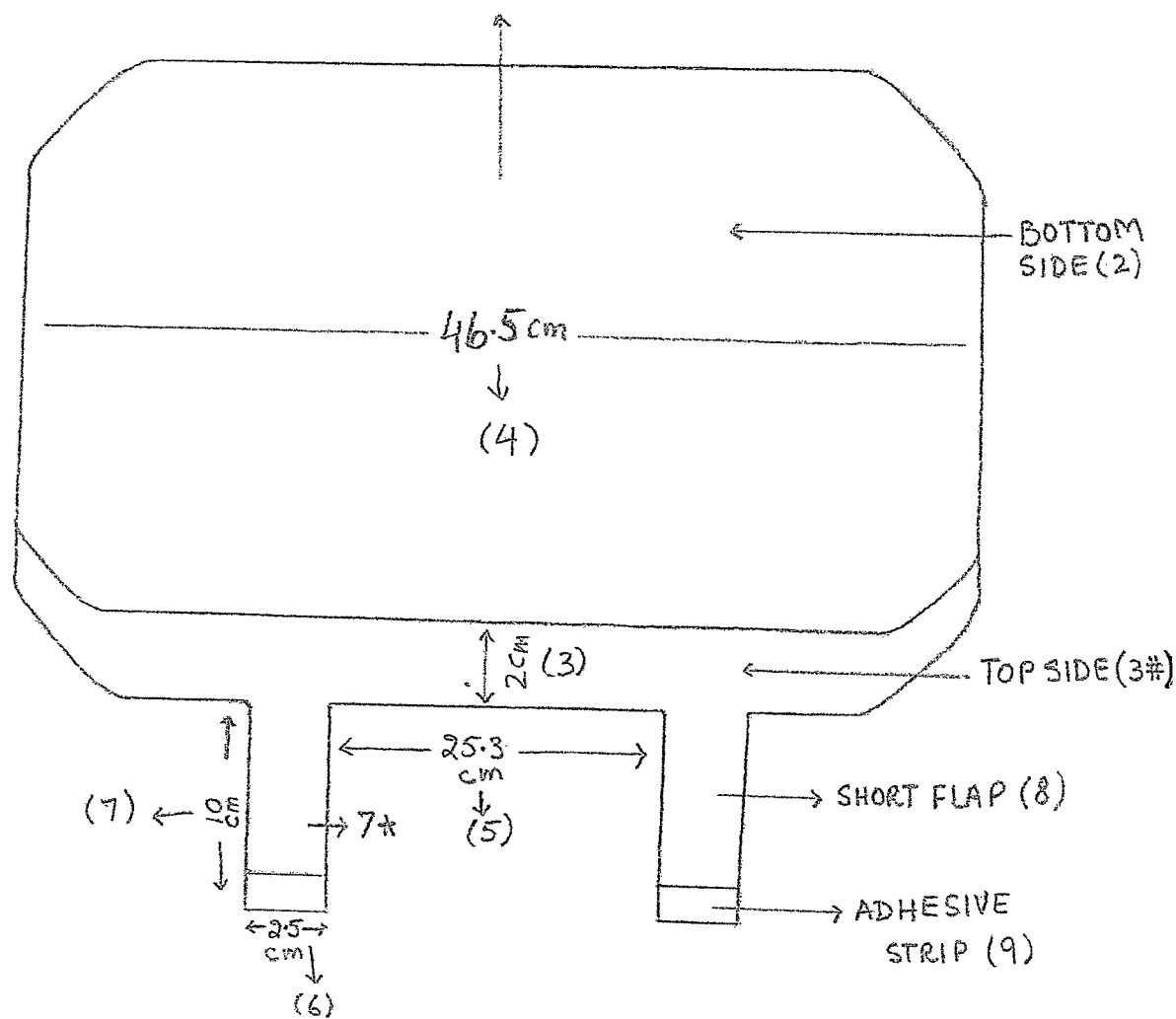
FIG. 1 is a sketched perspective view of the rectangular semi sealed version of the garbage bin lid cover. The sketch shows the length and width along with the top and bottom sides of the cover to give an idea of the difference between the width of the top and bottom side.
Figure 2:
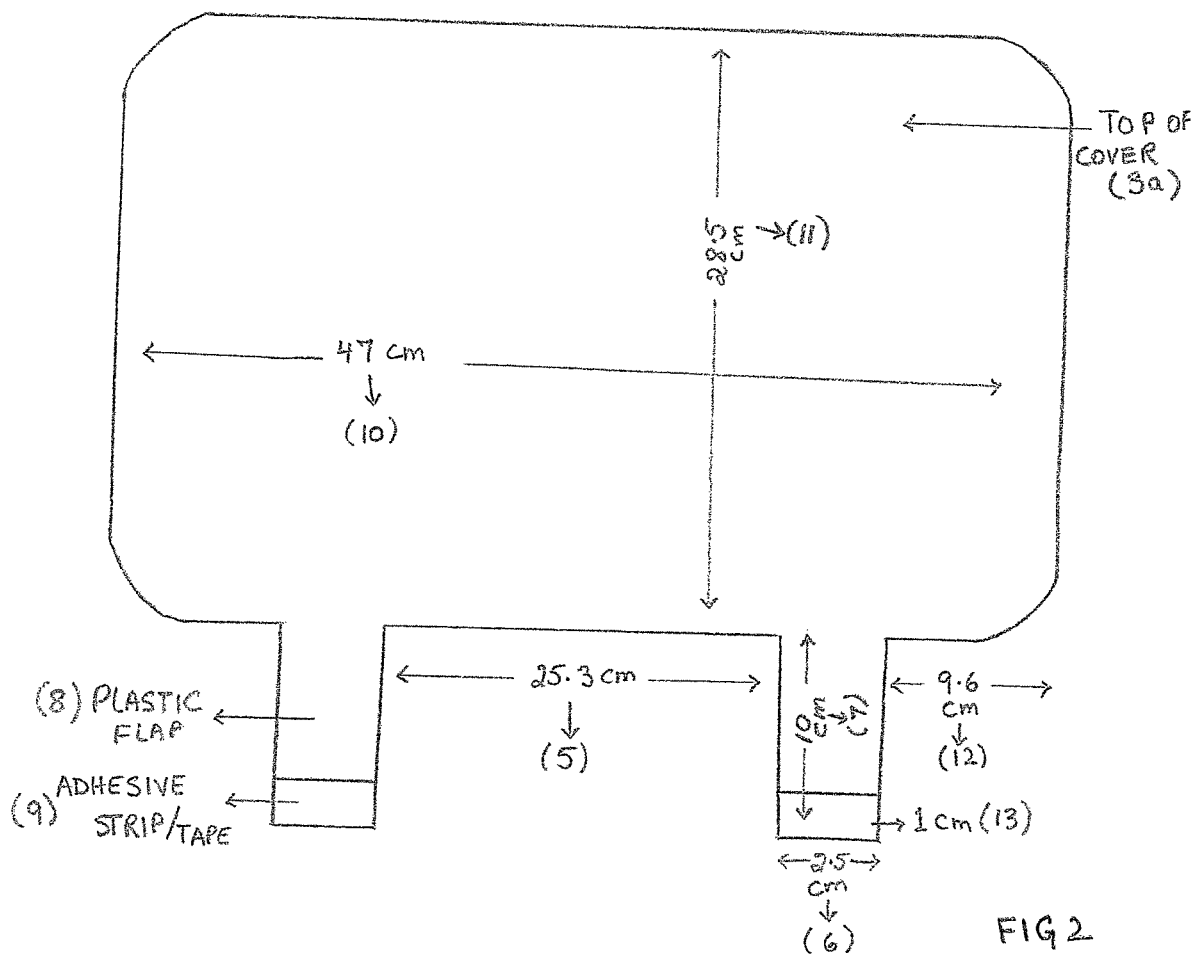
FIG. 2 is the sketched top view of the garbage bin lid cover with the straps/flaps on one side with the adhesive strips.
Figure 3:
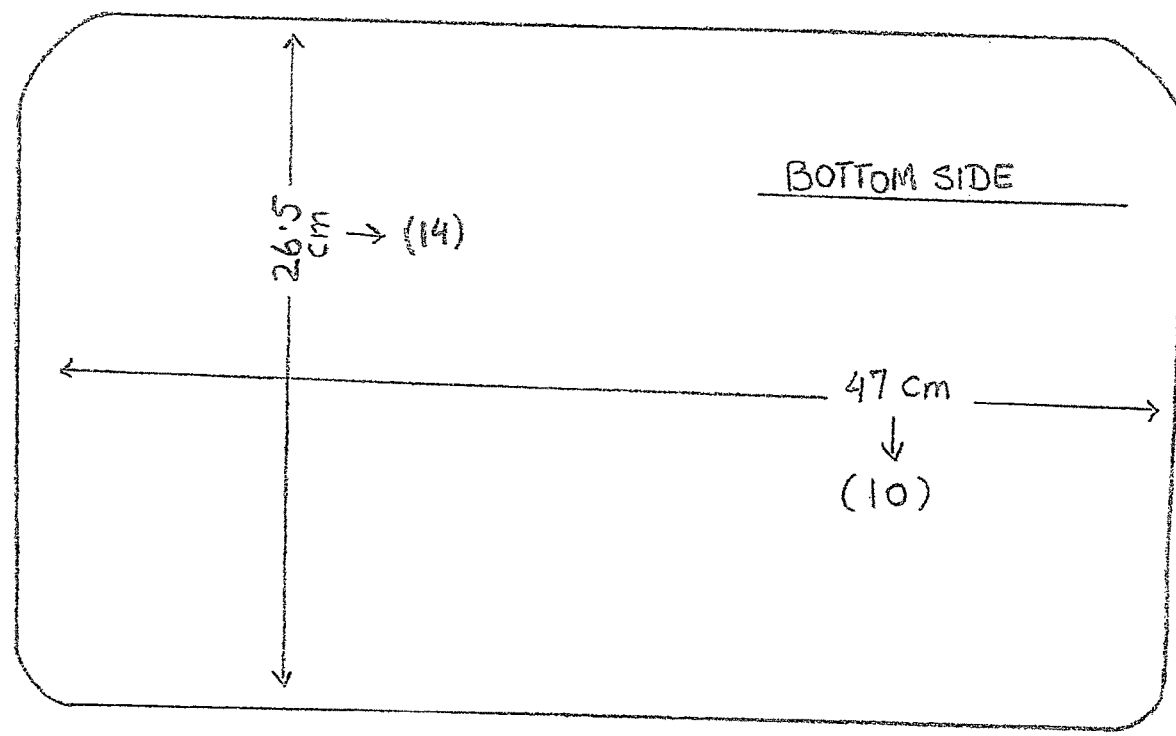
FIG. 3 is the sketched bottom view of the garbage bin lid cover which is slightly smaller in width from the top side.

FIG. 1 is a sketched perspective view of the rectangular semi sealed version of the garbage bin lid cover. The sketch shows the length and width along with the top and bottom sides of the cover to give an idea of the difference between the width of the top and bottom side. Where the bottom side which faces the garbage is slightly smaller in width from the top side. The straps/flaps are part of the top side to be adhered to the bottom side with adhesive strips turning inwards after placing on the garbage bin lid. The strap/flaps are made on the open side of the top side of the garbage bin lid cover. FIG. 2 shows the top side of the rectangular cover with its measurements and flaps. FIG. 3 shows the bottom side of the rectangular cover with no flaps. 1 is the material used for the cover which is 0.6 gauge plastic. 2 is the bottom side of the rectangular garbage bin lid cover. 3 is the 2 cm extended top side width of the garbage rectangular lid cover showing it is bigger than the bottom side. 3 #is the top side of the garbage rectangular lid cover. 4 is the 46.5 cm length of the bottom side of the garbage rectangular lid cover. 5 is the 25.3 cm length of the middle section between the plastic flaps on the top side of the garbage rectangular lid cover. 6 is the 2.5 cm width of the adhesive strip on the end of the extended flaps on the top side of the rectangular garbage lid cover. 7 is the 10 cm total length of the plastic flap extending out of the top side of the rectangular garbage bin lid cover. 7* is the 9 cm long part of the plastic flaps ending at the adhesive strip part of the plastic flaps extending out on the top side of the rectangular bin lid cover. 8 is the plastic flap extending out of the top side of the rectangular garbage bin lid cover. 9 is the adhesive strip on the plastic flaps extending out of the top side of the rectangular garbage bin lid cover. 10 is the 47 cm total length of the top side of the rectangular garbage bin lid cover. 11 is the 28.5 cm width of the top side of the rectangular garbage bin lid cover. 12 is the 9.6 cm length of the side of the top side going to the corner from the edge of the plastic flaps on both sides of the rectangular garbage bin lid cover. 13 is the 1 cm width of the adhesive strip at the end of the plastic flaps on the top side of the rectangular garbage bin lid cover. 14 is the 26.5 cm width of the bottom side of the rectangular garbage bin lid cover.

Figure 4:
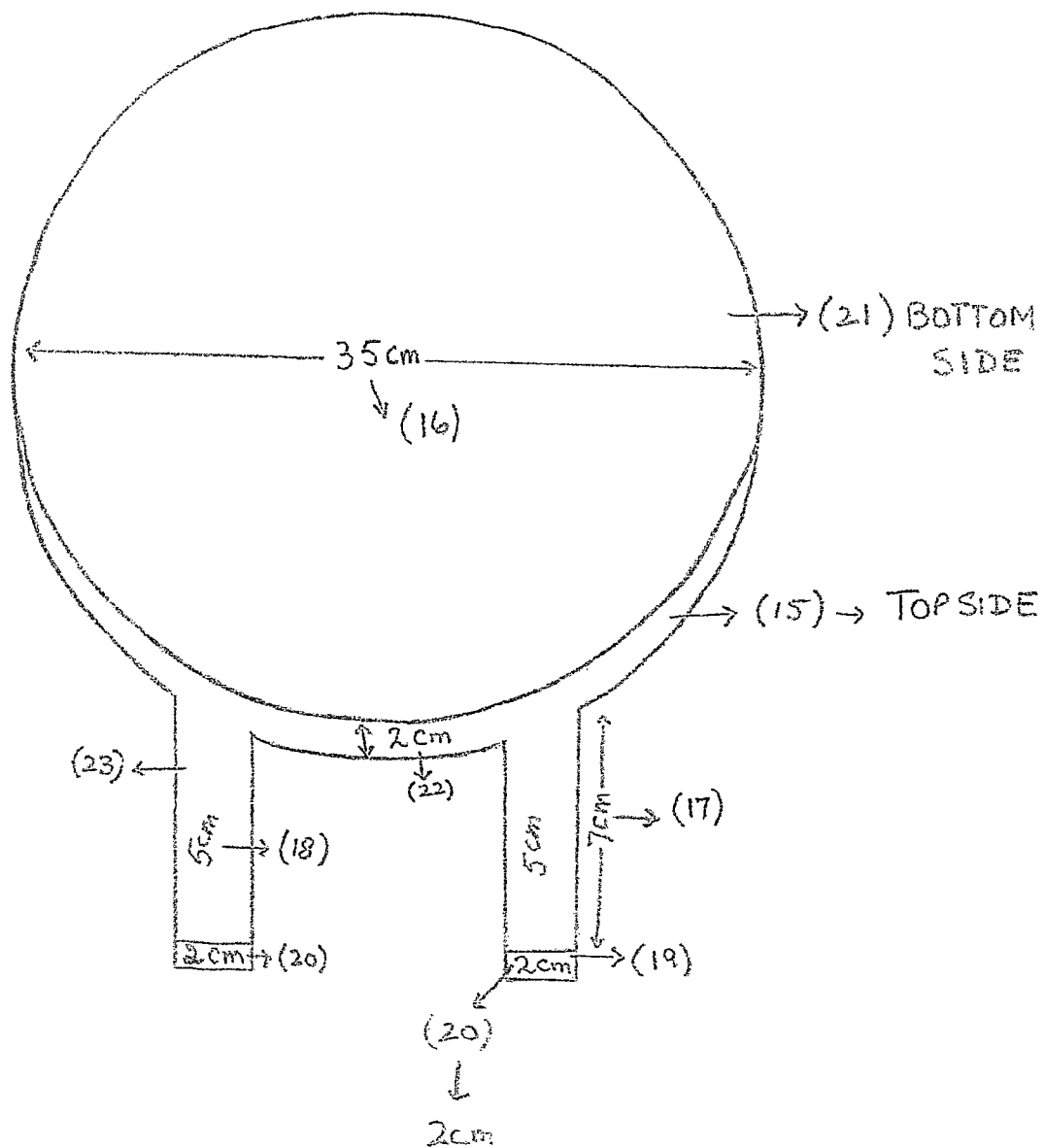
FIG. 4 is a sketched perspective view of the semi sealed circular version of the garbage bin lid cover. The sketch shows the diameter along with the top and bottom sides of the cover.
Figure 5:
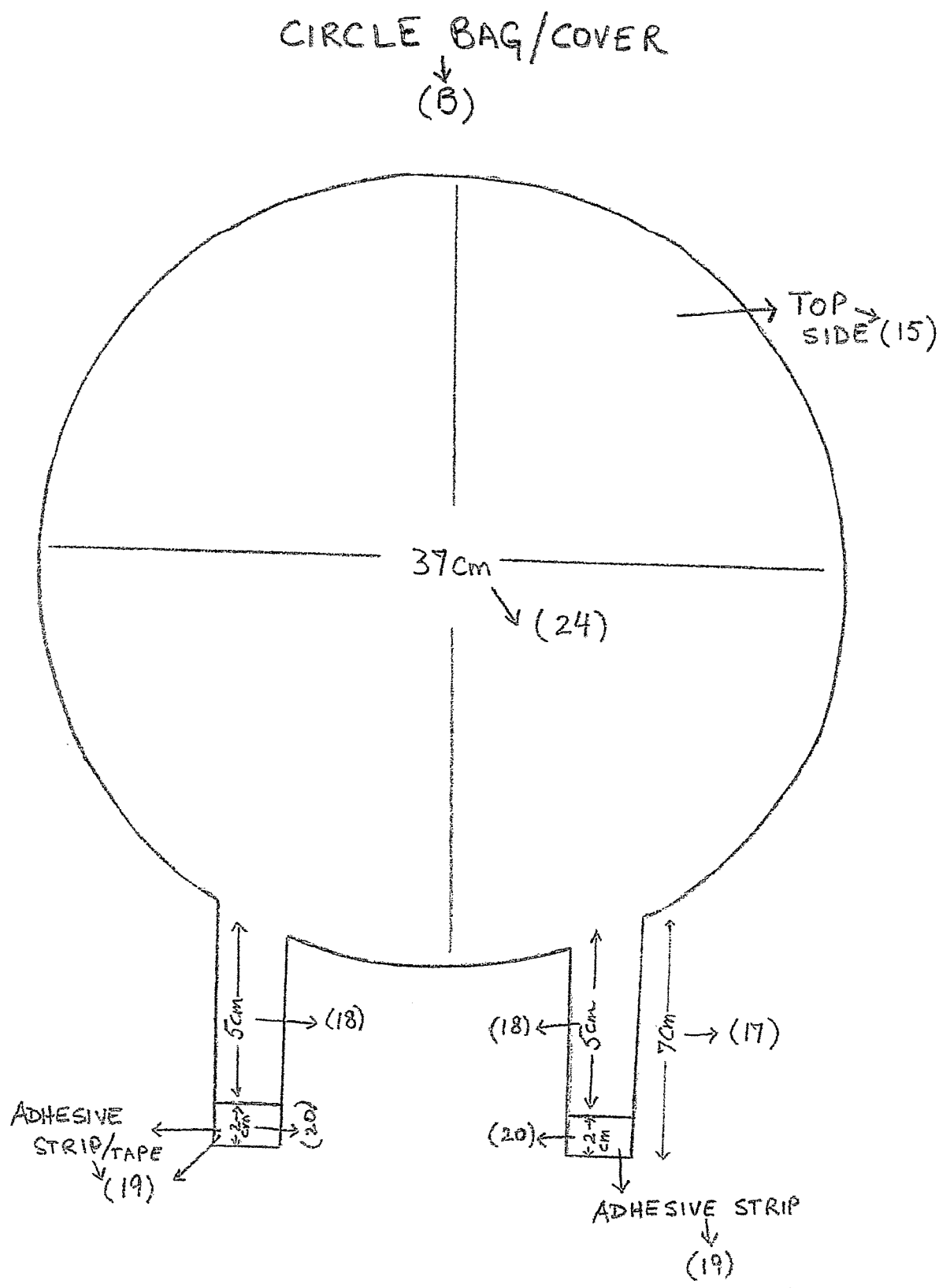
FIG. 5 is the sketched top view of the circular garbage bin lid cover. It shows the diameter for simply understanding the specifications of the lid cover to give an idea of the difference in size from the bottom side.
Figure 6:
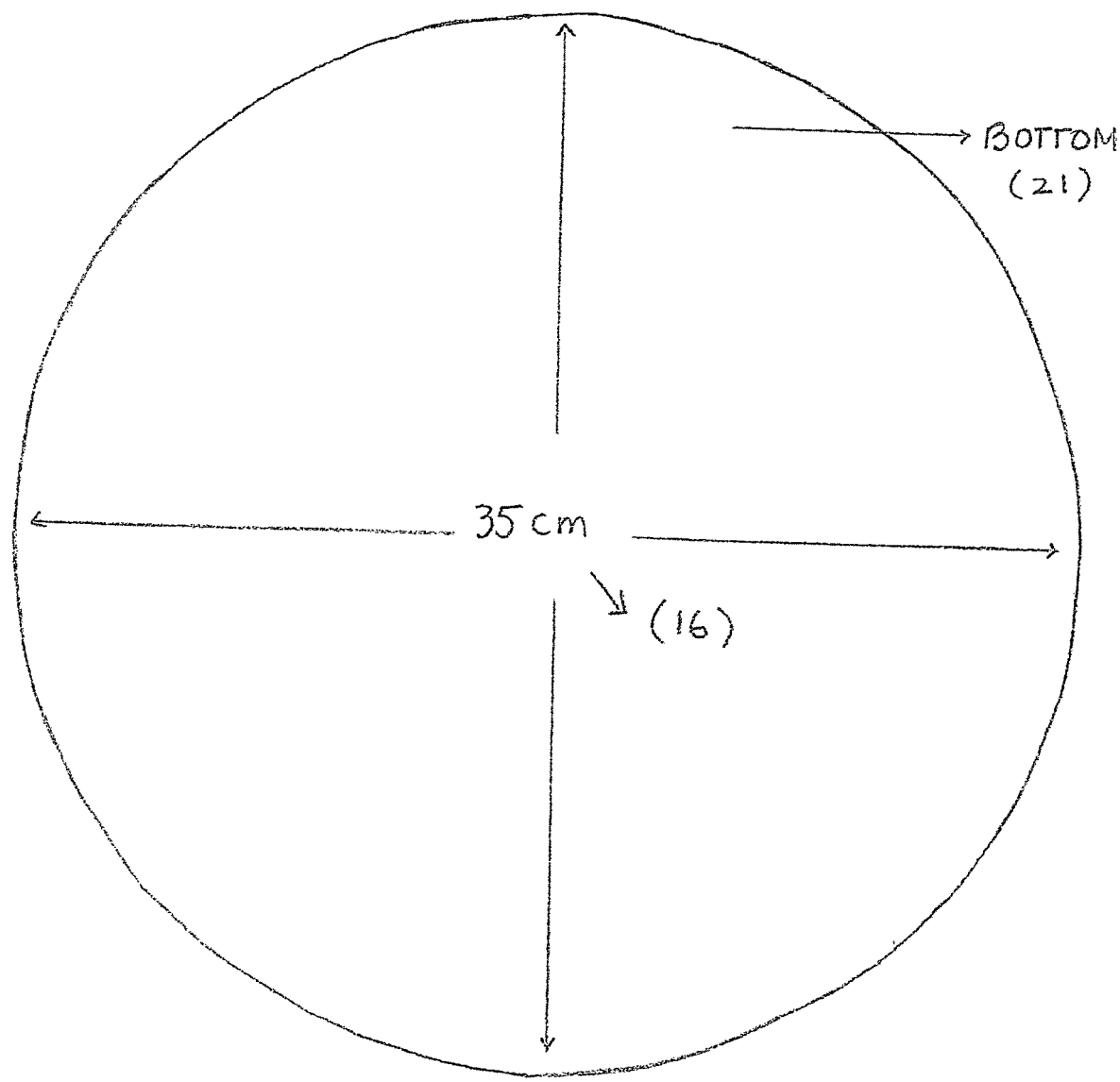
FIG. 6 is the sketched bottom view of the circular garbage bin lid cover which is slightly smaller from the top side.

FIG. 4 is a sketched perspective view of the semi sealed circular version of the garbage bin lid cover. The sketch shows the diameter along with the top and bottom sides of the cover. It shows the diameter for simply understanding the specifications of the lid cover to give an idea of the difference in size between the top and bottom sides. The bottom side which faces the garbage is slightly smaller from the top side at one end. The straps/flaps are part of the top side to be adhered to the bottom side with adhesive strips turning inwards after placing on the garbage bin lid. The strap/flaps are made on the open side of the top side of the garbage bin lid cover. FIG. 6 is the bottom side of the circular bin lid cover with its measurements. 15 is the top side of the circular garbage bin lid cover. 16 is the 35 cm diameter measurement of the bottom side of the circular garbage bin lid cover. 17 is the 7 cm total length of the plastic flaps extending out of the top side of the circular garbage bin lid cover. 18 is the 5 cm long part of the plastic flap extended from the top side of the circular. garbage bin lid cover. 19 is the adhesive strip on the end of the plastic flaps extending out of the top side of the circular garbage bin lid cover. 20 is the 2 cm width of the adhesive strip at the end of the plastic flaps on the circular garbage bin lid cover. 21 is the bottom side of the circular garbage bin lid cover. 22 is the 2 cm extended portion of the top side of the circular garbage bin lid cover to show the top side is a little bigger than the bottom side. 23 is the plastic flaps extending out on the top side of the circular garbage bin lid cover. 24 is the 37 cm total diameter of the top side of the circular garbage bin lid cover.

The invention claimed is:

1. An easy lid cover designed for household garbage bin lids or commercial garbage bin lids to keep the respective lid clean, the cover comprising:

a top side;

a bottom side;

wherein along a first portion of a perimeter of the sides, the top side and bottom side are connected, and wherein along a second portion of a perimeter of the sides, the top side and bottom side are not connected thereby forming an opening between the top and bottom sides;

wherein the bottom side is slightly smaller than the top side such that the top side extends beyond an edge of the bottom side at the opening;

wherein the top side has two flaps extending out from an edge of the opening, the flaps are spaced apart and each flap has an end with an adhesive strip to secure the flap to the bottom side once the cover is placed on the lid of the garbage bin, wherein a surface of the bottom side faces inside the garbage bin and a surface of the top side faces outside once the cover is placed on the lid of the garbage bin such that the garbage bin lid remains clean; and wherein the cover is configured to be secured to the garbage bin lid by turning the flaps inwards and fixing the adhesive strips to the bottom side of the cover on the garbage bin lid.

2. The easy lid cover of claim 1, wherein the top side further includes a handle.

* * * * *